United States Patent [19]

Mangone, Jr.

[11] Patent Number: 5,350,267
[45] Date of Patent: Sep. 27, 1994

[54] APPARATUS FOR MOUNTING RELATIVELY RIGID OBJECTS

[76] Inventor: Peter G. Mangone, Jr., 28600 Buchanan Dr., Evergreen, Colo. 80439

[21] Appl. No.: 1,348

[22] Filed: Jan. 7, 1993

Related U.S. Application Data

[63] Continuation-in-part of Ser. No. 776,979, Oct. 15, 1991, abandoned.

[51] Int. Cl.⁵ .......................... F16B 15/08; B25C 5/02
[52] U.S. Cl. ..................................... 411/442; 411/457; 411/920; 248/71; 227/120
[58] Field of Search ............... 411/442, 443, 444, 920, 411/440, 441, 469, 457, 356, 439, 40, 41; 248/68.1, 71, 475.1, 216.1; 227/139, 120, 143, 154

[56] References Cited

U.S. PATENT DOCUMENTS

| | | | |
|---|---|---|---|
| 2,526,902 | 10/1950 | Rublee | 411/920 |
| 2,637,030 | 5/1953 | Wickman et al. | |
| 3,241,797 | 3/1966 | Anderson | 411/469 X |
| 4,582,288 | 4/1986 | Ruehl | 411/546 X |
| 4,801,061 | 1/1989 | Mangone, Jr. | 411/442 X |
| 4,801,064 | 1/1989 | Mangone, Jr. | 411/442 X |
| 4,805,824 | 2/1989 | Erickson | 227/120 |

FOREIGN PATENT DOCUMENTS

| | | | |
|---|---|---|---|
| 3047462 | 6/1982 | Fed. Rep. of Germany | 411/54 |
| 340675 | 10/1959 | Switzerland | 248/68.1 |
| 1226569 | 3/1971 | United Kingdom | 248/71 |
| 1239409 | 7/1971 | United Kingdom | 411/41 |
| 1403714 | 8/1975 | United Kingdom | 248/68.1 |
| 1554602 | 10/1979 | United Kingdom | |

*Primary Examiner*—Rodney M. Lindsey
*Attorney, Agent, or Firm*—Joseph J. Kelly

[57] ABSTRACT

A system for attaching a rod, pipe or tube to a support surface in a spaced relationship thereto using plastic mounting devices, each of which has a central body portion, integral spaced apart leg portions and an inner arcuate surface greater than 180 degrees and having terminal end portions spaced from end surfaces of the leg portion, in an automated process wherein the leg portions are restrained from pivotal movement relative to the central body portion so that the portions of the mounting device adjacent to the terminal end portions will deform as they move over the rod, pipe or tube and then resile to move the rod, pipe or tube into the inner arcuate surfaces.

20 Claims, 4 Drawing Sheets

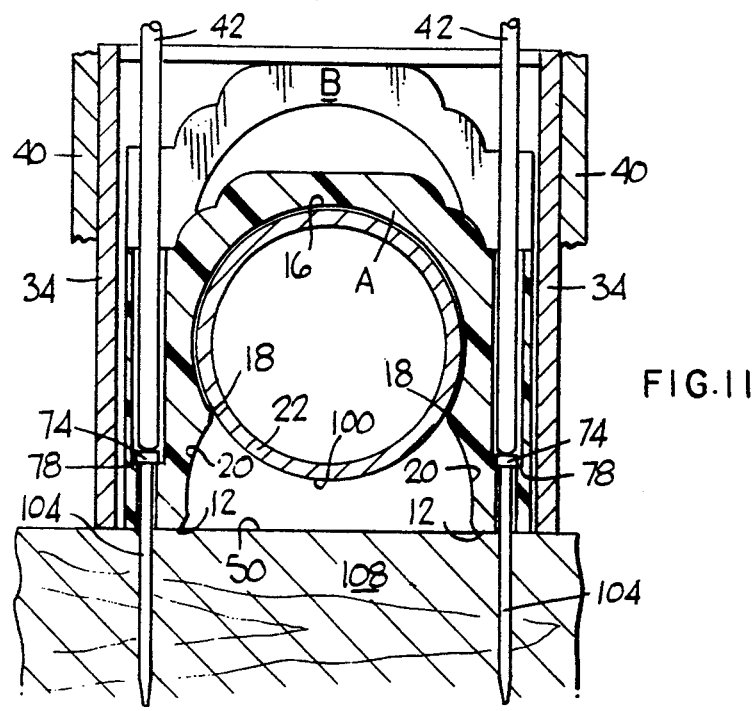
FIG.11
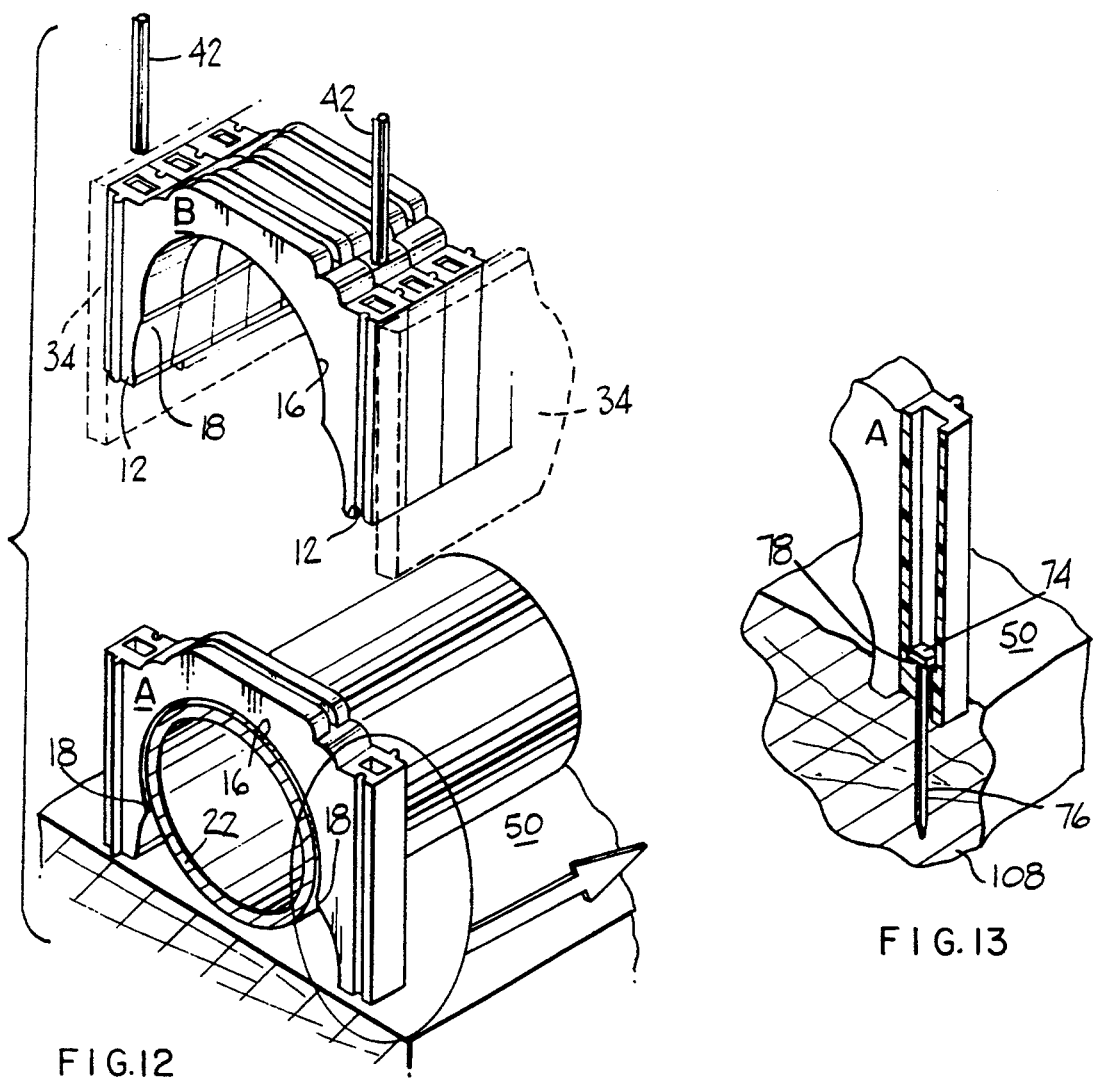
FIG.12
FIG.13

APPARATUS FOR MOUNTING RELATIVELY RIGID OBJECTS

This application is a continuation-in-part of U.S. patent application Ser. No. 776,979 filed Oct. 15, 1991.

FIELD OF THE INVENTION

This invention relates generally to the field of attaching objects to a support surface and more particularly to the attaching of an elongated relatively rigid object, such as a rod, pipe or tube, to a support surface so that it is spaced from the support surface.

BACKGROUND OF THE INVENTION

In U.S. Pat. Nos. 4,801,061 and 4,801,064 to Peter G. Mangone, Jr., which patents are incorporated herein by reference thereto, there is disclosed a system for attaching a sensitive signal conducting insulated cable to a support surface. These patents use plastic mounting devices having surface penetrating fastening devices mounted therein in such a manner so as to allow a multiplicity of mounting devices to be positioned, discharged and applied in a uniform automated process. When using the system in these patents, the cable is in contact with the support surface when attached thereto. When attaching an elongated relatively rigid object, such as a rod, pipe or tube to a support surface, it is often desired that the elongated relatively rigid object be spaced from the support surface. Therefore, the use of the system in the above patents may not result in the most desirable finished product.

SUMMARY OF THE INVENTION

This invention provides a system for attaching an elongated relatively rigid object to a support surface so that it is spaced from the support surface.

In a preferred embodiment of the invention, an assembly of mounting devices is provided for use in an applicator tool for attaching an elongated relatively rigid object, such as a rod, pipe or tube, to a support surface, so that the elongated relatively rigid object is spaced from the support surface. A plurality of individual mounting devices are mounted in abutting relationship to provide an elongated row of mounting devices having a longitudinal axis extending therethrough. Each of said mounting devices has a central body portion and spaced apart leg portions having oppositely facing side surfaces, and end surfaces for contacting the support surface. Each of the mounting devices has an open ended inner surface with at least a portion of the inner surface comprising an arcuate section having an arcuate extent greater than one hundred and eighty degrees and having terminal end portions so that a portion of an elongated relatively rigid object having a relatively circular outer surface may be moved into and retained therein. The arcuate section is spaced from the end surfaces for purposes described below. Moving means are provided in the applicator tool for moving one of the mounting devices over the portion of the elongated relatively rigid object while it is supported on the support surface until the end surfaces of the mounting device are in contact with the support surface. Force applying means are provided for moving the portion of the elongated relatively rigid object into the arcuate section so that the portion of the elongated relatively rigid object is spaced from the support surface. Attaching means are provided for attaching the one of the mounting devices to the support surface.

Each of the mounting devices is formed from a plastic material having resilient characteristics so that it will deform when a sufficient force is applied thereto and resile back toward its original shape when the sufficient force is removed. It is this characteristic that applies a resilient force to the portion of the elongated relatively rigid object to move it into the arcuate section. If the elongated relatively rigid object is also formed from a plastic material, it too may be deformed to provide all or some of the resilient force as it resiles back toward its original shape. Restraining means are provided for restraining pivotal movement of the leg portions relative to the central body portion when the one of the mounting devices is moved over the portion of the elongated relatively rigid object. The restraining means comprise at least portions of the attaching means embedded into a support member having the support surface thereon and at least other portions of the attaching means located in the leg portions. Additional restraining means are provided by dimensioning the oppositely facing side surfaces of the mounting device so that they will be in contact with inner sidewalls of the applicator tool while being moved through a discharge chamber in the applicator tool. The movement of the one of the mounting devices over a portion of the elongated relatively rigid object applies a force sufficient to deform at least portions of the leg portions immediately adjacent to the arcuate section and the resilient force generated by the deformed portions returning toward their original shape moves the portion of the elongated relatively rigid object into the arcuate section.

Each of the mounting devices has a bore extending through each of the leg portions and has at least a portion of a surface penetrating fastening device located in each bore. Each of the mounting devices is provided with interlocking means preferably comprising an interlocking rib and groove on its front surface and an interlocking rib and groove on its back surface. The interlocking rib on the back surface of one of the mounting devices is located in the groove on the front surface of the next adjacent mounting device and the interlocking rib on the front surface of the next adjacent mounting device is located in the groove on the back surface of the one of the mounting devices. This interlocking relationship restrains relative movement between adjacent mounting devices in one direction but permits relative guided movement between adjacent mounting devices in another direction. The frictional resistance provided by this interlocking relationship is greater than the frictional resistance of the surface penetrating fastening devices and the bores so that forces may be applied to the surface penetrating fastening devices in one of the mounting devices to move the surface penetrating fastening devices through the bores and to embed at least a portion of each of the surface penetrating fastening devices into the support surface without inducing any significant movement of the one of the mounting devices. Each of the bores has a first portion and a second portion with a shoulder formed at the juncture of the upper and lower portions. The first portion has an axial extent greater than the second portion. Each of the surface penetrating devices has an enlarged head portion for contacting the shoulder so that when the forces are applied to the surface penetrating devices after the enlarged head portions have moved into contact with the shoulders, the one of the mounting devices will move relative to the next adjacent mounting device. The applicator tool has an open bottom portion having abutment surface means so that it can be placed on the support surface. The applicator tool has spaced apart track means for supporting the assembly of mounting devices and a discharge chamber for receiving only one of the mounting devices. Force applying means are located in the applicator tool so that they can apply forces to the surface penetrating fastening devices. The terminal end portions of the arcuate section of each mounting device are located so that the distance between at lest one, but preferably each, of the terminal end portions and the support surface is less than one-half the diameter of the elongated relatively rigid object. The inner surface has a generally arcuate portion located between each of the terminal end portions and each of the end surfaces with the end surfaces being spaced apart a greater distance than the spaced apart terminal end portions. The arcuate portions can be of other shapes including linear. The distance between the end surfaces is greater than the diameter of the elongated relatively rigid object so that the applicator tool may be placed over the elongated relatively rigid object with the abutment surface means in contact with the support surface with at least a portion of the elongated relatively rigid object located between the generally arcuate portions. The portion of the elongated relatively rigid object located between the generally arcuate portions has an arcuate extent greater than one hundred and eighty degrees.

In the operation of the preferred embodiment of the invention, forces are applied to the surface penetrating fastening devices in a mounting device in the discharge chamber of the applicator tool to move the surface penetrating fastening devices through the bores to embed at least portions of each surface penetrating fastening devices into the support member having the support surface thereon. During this movement of the surface penetrating fastening devices, the mounting device in the discharge chamber will remain relatively stationary.

After the enlarged head portions have contacted the shoulders, the forces applied to the surface penetrating fastening devices will move the mounting device in the discharge chamber toward the support surface. The movement of the mounting device will be guided by the interlocking relationship. As the mounting device moves toward the support surface, the portions of the mounting device adjacent to the terminal end portions of the arcuate sections will be deformed. As stated above, the distance between each terminal end portion and the support surface is less than one-half the diameter of the elongated relatively rigid object so that as the mounting device approaches the support surface, the resilient characteristics of the material from which the mounting device is formed will apply forces on a portion of the elongated relatively rigid object to move it into the arcuate section. After the end surfaces have moved into contact with the support surfaces, the applicator tool is lifted to separate the mounting device in the discharge chamber from the next adjacent mounting device. The portion of the elongated relatively rigid object is attached to the support surface and spaced a distance therefrom.

BRIEF DESCRIPTION OF THE DRAWINGS

Illustrative and presently preferred embodiments of the invention are shown in the accompanying drawings in which:

FIG. 11 is a front elevational view similar to FIGS. 9 and 10 after a third stage of application;

FIG. 12 is a perspective view of the mounting device attached to the support surface with the applicator tool removed;

FIG. 13 is an enlarged view of a portion of FIG. 12;

DETAILED DESCRIPTION OF THE INVENTION

Figure 7:
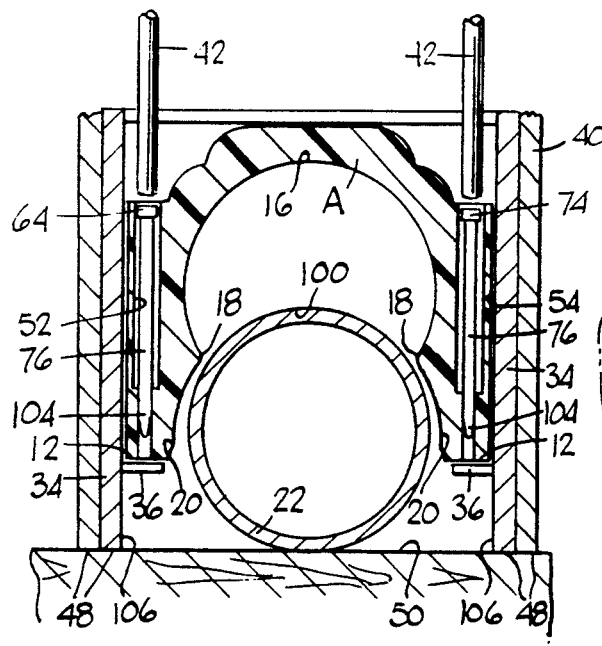
FIG. 7 is a front elevational view with parts in section of a mounting device in the discharge chamber.

In FIGS. 3–6, there is illustrated a mounting device 2 which has a generally inverted U-shaped configuration having a central body portion 4 and a pair of spaced apart leg portions 6. Each leg portion 6 has a bore 8 extending therethrough and having an opening 10 in the each end surface 12 of the pair of leg portions 6. Each mounting device 2 has an inner surface 14 having an arcuate section 16 having terminal end portions 18 so that the arcuate section 16 has an arcuate extent greater than one hundred and eighty (180) degrees. The inner surface 14 has generally arcuate portions 20 located between the terminal end portions 18 and the end surfaces 12 and the distance between the generally arcuate portions 20 adjacent to the end surfaces 12 is greater than the distance between the generally arcuate portions 20 adjacent to the terminal end portions 18. This permits the mounting device 2 to be positioned over a pipe 22, as illustrated in FIG. 7. Although the application is explained in relation to a pipe formed from a rigid metallic or plastic material, it is understood that the invention has application with any elongated relatively rigid object. As used herein, an elongated relatively rigid object is one that will have no appreciable sag when supported on supports spaced about a foot apart. The linear distance between each of the terminal end portions 18 and a plane in which the end surfaces 12 lie is less than one-half the diameter of the pipe 22 for purposes described below.

Portions of an applicator tool 30 are illustrated in FIGS. 1, 2, 7 and 8. An elongated lower jaw section 32 of the applicator tool has opposite sidewalls 34 and track means comprising a flange 36 projecting inwardly from each sidewall 34 for supporting a plurality of interconnected mounting devices 2 (as described below).

Figure 8:
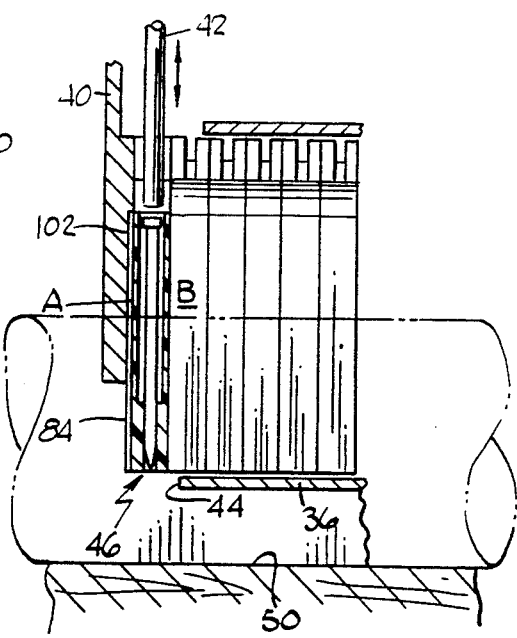
FIG. 8 is a partial side elevational view of FIG. 7.

Each sidewall 34 has a terminal end portion 38. The elongated lower jaw section 32 is attached to the body portion 40 of a conventional staple gun, such as those manufactured by DuoFast, so that the hammer portions 42 thereof are properly located for purposes described below. As illustrated in FIG. 8, each flange 36 has a terminal end portion 44 so as to provide a discharge chamber 46 for the passage of a mounting device 2 therethrough. The sidewalls 34 and the body portion 40 have bottom abutment surfaces 48 lying in the same plane so that the applicator tool 30 may be positioned over the pipe 22 on the support surface 50.

Each of the mounting devices 2 is formed from a plastic material, such as polyethylene or polypropylene or any other material having similar characteristics. The plastic material must be capable of resiling, that is, returning to its original shape after it has been deformed. Each mounting device has a length, a width and a depth and has oppositely facing side surfaces 52 and 54 top 56 and bottom 58 surfaces and front 60 and rear 62 surfaces. The central body portion 4 has a recess 64 formed therein.

Figure 1:
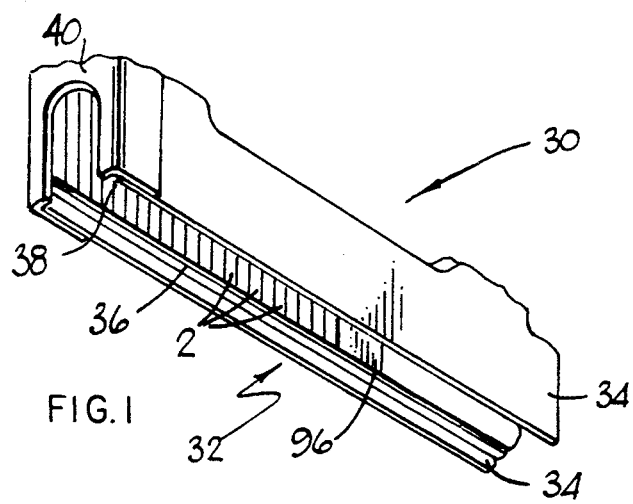
FIG. 1 is a perspective view from the bottom of a portion of an applicator tool.
Figure 2:
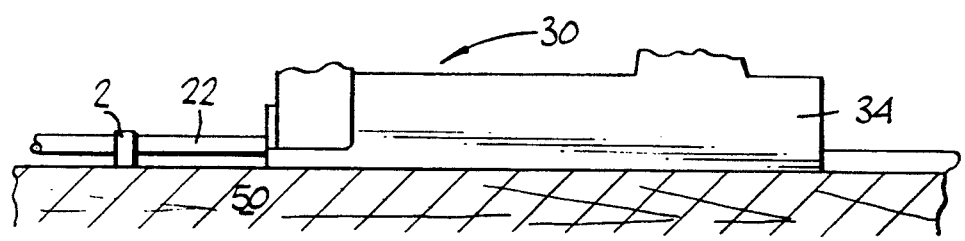
FIG. 2 is a side elevation view of a portion of an applicator tool positioned over a portion of a pipe.
Figure 3:
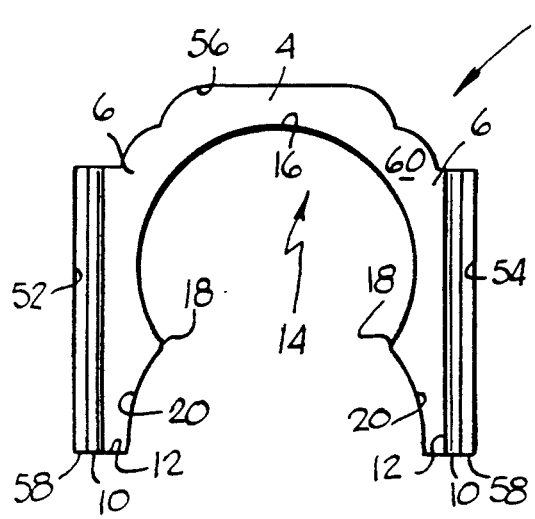
FIG. 3 is front elevational view of a mounting device.
Figure 5:
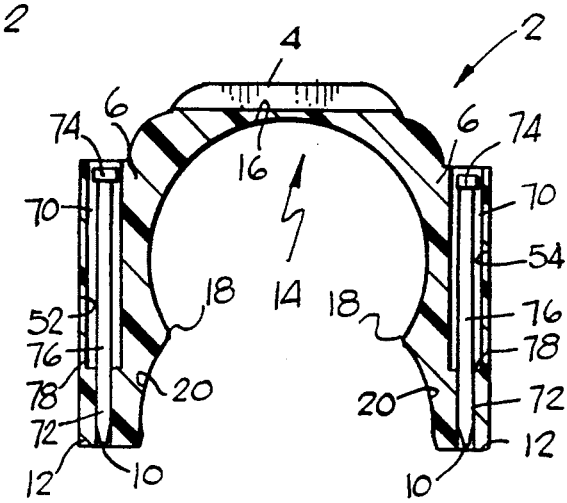
FIG. 5 is a cross-sectional view taken on the line 5—5 of FIG. 4.
Figure 4:
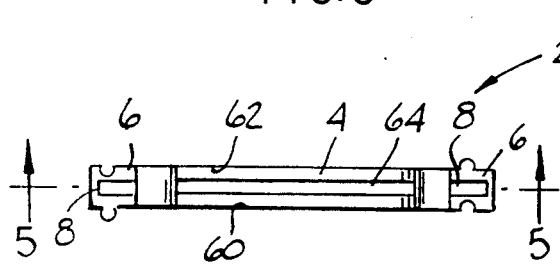
FIG. 4 is a top plan view of FIG. 3.
Figure 6:
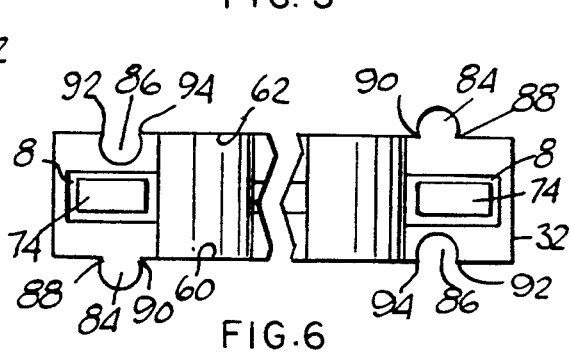
FIG. 6 is an enlarged top plan view of FIG. 5.

Each of the bores 8 is in the form of a counter bore having a first portion 70 having a relatively large cross-sectional configuration and a second portion 72 having a relatively small cross-sectional configuration. The first portion 70 has an axial extent greater than the second portion 72. A surface penetrating fastening device is located in each bore 8 and has a relatively large head portion 74 having a cross-sectional configuration generally similar to that of the first portion 70, preferably rectangular, and an elongated shank portion 76 having a cross-sectional configuration generally similar to that of the second portion 72, preferably generally circular. The cross-sectional configuration of the enlarged head portions 74 is slightly smaller than the cross-sectional configuration of the first portion 70 so as to facilitate passage of the enlarged head portion 74 therethrough. The Cross-sectional configuration of the shank portion 76 is equal to or slightly greater than the cross-sectional configuration of the second portion 72 so as to provide a frictional fit. An abutment shoulder 78 is formed at the juncture of the upper portion 70 and the second portion 72. If desired, the surface penetrating fastening devices and the bores can be of other configurations and the hammer portion 42 can be of other configurations. In FIG. 5, the surface penetrating fastening device is completely within the first portion 70 and the second portion 72. However, if desired, a portion of each of the shank portions 76 may extend through the openings 10 or a portion of the enlarged head portions 76 may extend above the leg portion 6.

The mounting device 2 is provided with means so that one mounting device 2 can be interlocked with an adjacent mounting device 2. The interlocking means comprise a rib 84 projecting outwardly from the front surface 70, a groove 86 projecting inwardly in the front surface 60 and a similar rib 84 and groove 86 formed on the rear surface 62. It is understood that the interlocking means can comprise one or more ribs on the front surface and one or more cooperating grooves in the rear surface. The interlocking ribs 84 are generally circular in cross-sectional configuration and have an arcuate peripheral surface extending for an arcuate distance of between about 185 degrees and 345 degrees so as to form notches 88 and 90 between the peripheral surfaces of the ribs 84 and the front surface 60 and back surface 62. The interlocking grooves 86 are generally circular in cross-sectional configuration and have an arcuate surface extending for an arcuate distance of between about 185 degrees and 345 degrees with a slot entering into the interlocking grooves 86 so as to form resilient flange portion 92 and 94. Adjacent mounting devices are interlocked by pushing the interlocking ribs 84 into the interlocking grooves 86 until the front surface 60 of one mounting device is in contact with the rear surface 62 of an adjacent mounting device. In the assembled relationship, the resilient flange portions 92 and 94 are seated in the notches 88 and 90 so as to hold the adjacent mounting devices in the assembled relationship. This interlocking relationship restrains relative movement between adjacent mounting devices in one direction but permits relative guided movement between adjacent mounting devices in another direction. While the interlocking grooves 86 have been described with arcuate surfaces, the grooves only need to have a cross-sectional area to accommodate the interlocking ribs and can be of any geometrical configuration as long as the appropriate flange portions 92 and 94 are provided. The frictional forces resulting from this interlocking relationship are substantially greater than the frictional forces necessary to move the shank portion 76 through the second portions 72 so that forces can be applied to the enlarged head portions 74 to move the shank portions 76 through the second portions 72 without any significant movement of the mounting device 2. A pusher block 96, FIG. 1, urges the mounting devices 2 toward the discharge chamber 46.

The operation of the apparatus is illustrated in FIGS. 7-13. In FIGS. 7 and 8, the applicator tool 30 has been positioned over a pipe 22 and the abutment surfaces 48 are in contact with the support surface 50. The circular outer surface 100 of the pipe 22 is slightly spaced from the generally arcuate portions 20. A mounting device A is in the discharge chamber 46 and the next adjacent mounting device B, interlocked with mounting device A, is supported on the flanges 36. The body portion 40 is provided with a recess portion 102 to receive at least a portion of a rib 84 so that a mounting device A is properly located in the discharge chamber 46. During the manufacture of the mounting devices 2, a portion 104 of the shank portions 76 has been moved into the second portions 72. The distance between the inner surfaces 106 of the sidewalls 34 of the discharge chamber 46 is substantially the same as the distance between the oppositely facing side surfaces 52 and 54 of the mounting device 2 so that there is contact between the oppositely facing side surfaces 52 and 54 and the adjacent inner surfaces 106. While this relationship is preferred, it is not necessary for the successful operation of the apparatus as set forth below. It is also noted that the portion of the pipe 22 located above the end surfaces 12 has an arcuate extent greater than one hundred and eighty (180) degrees.

Figure 9:
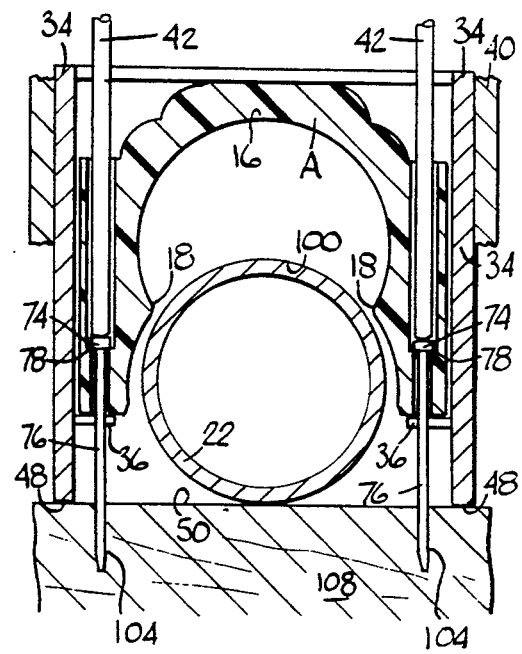
FIG. 9 is a front elevational view with parts in section of a mounting device after a first stage of application.

In FIG. 9, the hammer portions 42 have applied forces to the enlarged head portions 74 so that they have been moved downwardly until the enlarged head portions 74 are in contact with the abutment shoulders 78. It is understood that the term "downwardly" is used only to be consistent with the illustration and that the pipe could be being applied to a top surface, a bottom surface or a sidewall surface. During this operation, the portion 104 of the shank portions 76 has been driven into the support member 108 having the support surface 50 thereon and cooperates with the portion of the shank portion 76 remaining in the second portion 72 to provide restraining means to prevent pivotal movement of the leg portions 6 relative to the central body portion. The mounting device A in the discharge chamber 46 has not undergone any significant movement.

Figure 10:
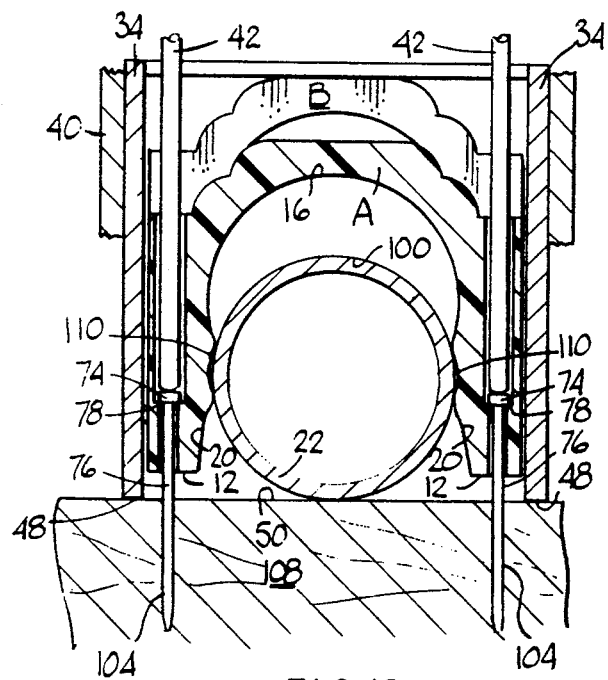
FIG. 10 is a view similar to FIG. 9 after a second stage of application.

The illustration in FIG. 10 occurs at some time between the illustrations in FIG. 9 and 11. The hammer portions 42 have applied forces to the enlarged head portions 74 and since they are in contact with the abutment shoulders 78, the mounting device A has been moved toward the support surface 50. As the mounting device A moves toward the support surface 50, the outer surface 100 of the pipe 22 contacts the generally arcuate portions 20. The continued movement of the mounting device A causes the pipe 22 to deform the portions 110 of the mounting device 2 adjacent to the terminal end portions 18. Lateral movement of the oppositely facing side surfaces 52 and 54 of the leg portions 6 away from each other is restrained by the portions 104 of the shank portions 76 embedded into the support member 108 and the portion of the shank portion 76 remaining in the second portion 72. Also, if the inner surfaces 106 are located as described above, they would also function to restrain lateral movement of the oppositely facing side surfaces 52 and 54 of the leg portions 6 away from each other. Also, if the inner surfaces 106 are located as described above, this would permit movement of the mounting device A until the end surfaces 12 are in contact with the support surface 50 prior to embedding the portions 104 into the support member 108. The portions 104 have been moved deeper into the support member 108 while the mounting device B has not undergone any significant movement. The end surfaces 12 are spaced from the support surface 50.

In the position illustrated in FIG. 11, the hammer portions 42 have applied additional forces on the enlarged head portions 74 to move the end surfaces 12 into contact with the support surface 50. As the end surfaces 12 move into contact with the support surface 50, the terminal end portions 18 resile back toward their original positions and apply forces on the outer surface 100 to move the pipe 22 into the arcuate section 16 and to be retained therein by the terminal end portions 18 so that the outer surface 100 is spaced from the support surface 50. As stated above, the terminal end portions 18 are located so that in the attached condition, illustrated in FIG. 11, the terminal end portions 18 are located above the support surface 50 a distance less than one-half the diameter of the pipe 22. This ensures that the resilient characteristic of the mounting device will move the portion of the pipe 22 into the arcuate section 16 to space it from the support surface 50.

If the elongated relatively rigid object is formed from a plastic material differing from that of the mounting device, it is then possible that it will deform and provide all or part of the resilient force to move the elongated relatively rigid object into the arcuate section 16.

In FIG. 12, the applicator tool has been moved away from the support surface 50 and in so doing mounting device A has been separated from mounting device B which has moved into the discharge chamber 46. As illustrated in FIG. 13, the mounting device A is firmly secured in the support member 108 with the enlarged head portion 74 in contact with the abutment shoulder 78 and a major portion of the shank portion 76 embedded in the support member 108.

Figure 14:
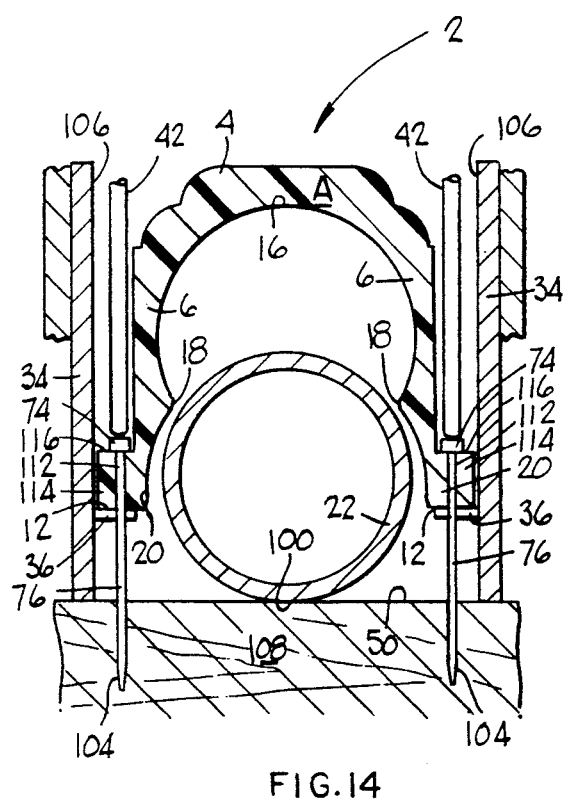
FIG. 14 is a view, similar to FIG. 9, of another preferred embodiment of the invention.
Figure 15:
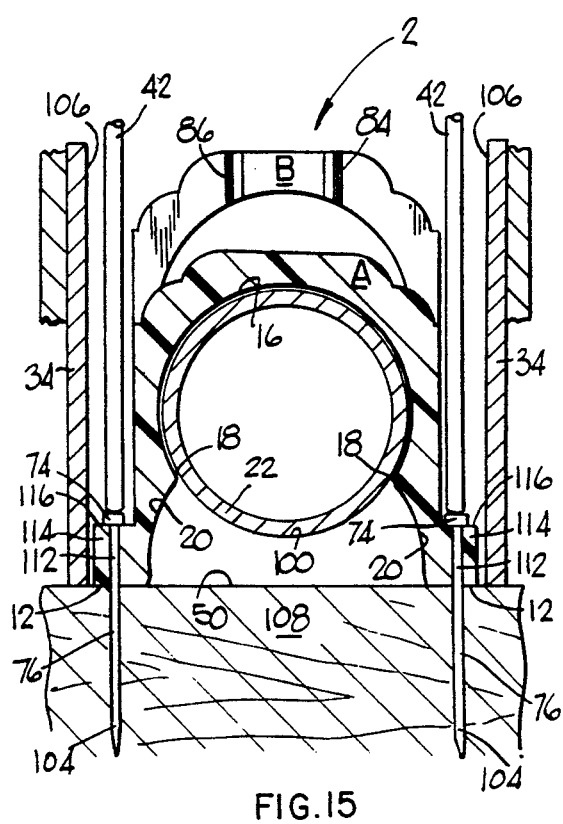
FIG. 15 is a view, similar to FIG. 11, of the another preferred embodiment of the invention.

Another preferred embodiment of the invention is illustrated in FIGS. 14 and 15 wherein corresponding parts have been given the same reference numerals. The major difference is in the leg portions which only have short bores 112 which correspond generally to the second portions 72 of FIG. 5. The bores 112 have a cross-sectional configuration similar to that of the shank portions 76 and preferably slightly smaller so that there is a frictional fit. The bores 112 are located in projecting bosses 114 to provide abutment surfaces 116.

The operation of the embodiment in FIGS. 14 and 15 is generally the same as that illustrated in FIGS. 7–13. The illustration in FIG. 14 corresponds to that in FIG. 9 wherein the hammer portions 42 have applied forces to the enlarged head portions 74 to move them down into contact with the abutment shoulders 116 and to embed the portions 104 into the support member 108. The mounting device A has not moved.

The illustration in FIG. 15 corresponds to that in FIG. 11 wherein the hammer portions 42 have applied forces to the enlarged head portions 74 to move the end surfaces 12 into contact with the support surface 50. As described above in relation to FIG. 10, as the mounting device A moves toward the support surface 50, the portions 110 adjacent to the terminal end portions 18 are deformed so that as the end surfaces 12 move into contact with the support surface 50, the resilient characteristic of the mounting device A will move the portion of the pipe 22 into the arcuate section 16 so that the portion of the outer surface 100 is spaced from the support surface 50.

In one embodiment of the invention, a mounting device 2, illustrated in FIG. 5, was integrally molded using a high density polyethylene material. The mounting device 2 was designed to be used to attach a copper pipe 22 to the support surface 50 wherein the outside diameter of the pipe was 0.875 inch. The mounting device has a length between the top 56 and the bottom 58 surfaces of about 1.125 inches; a width between the side surfaces 52 and 54 of about 1.250 inches; a depth between the front 60 and rear 62 surfaces of about 0.180 inch. The arcuate section has a diameter of about 0.875 inch and an arcuate extent of about 240 degrees. The distance between each terminal portion 18 and a plane passing through the end surfaces 12 is about 0.385 inch. The distance between the upper surfaces of the flanges 36 and the bottom abutment surfaces 48 is about 0.40 inch. The distance between the terminal portions is about 0.790 inch and the distance between the portions 20 adjacent to the end surfaces is about 0.925 inch. The distance between the centers of the bores 8 is about 1.062 inches.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

I claim:

1. Apparatus for use in attaching an elongated relatively rigid cylindrical object to a support surface so that the elongated relatively rigid cylindrical object is spaced from the support surface comprising:

a mounting device having a central body portion and a pair of spaced apart leg portions having end surfaces;

said mounting device having at least one inner surface;

said at least one inner surface having a first portion comprising an arcuate section having an arcuate extent greater than 180 degrees and having spaced apart terminal end portions so that a portion of said elongated relatively rigid cylindrical object may be retained in said arcuate section;

said at least one inner surface having second portions located between said spaced apart terminal end portions and said end surfaces;

moving means for moving said mounting device over said elongated relatively rigid cylindrical object while said elongated relatively rigid cylindrical object is in contact with said support surface so that movement of said elongated relatively rigid cylindrical object in the same direction as said mounting device is prevented;

restraining means for restraining pivotal movement of said leg portions relative to said central body portion when said one of said mounting devices is moved over said elongated relatively rigid cylindrical object;

force applying means for moving said elongated relatively rigid cylindrical object in a direction opposite to the direction of movement of said mounting device to move said portion of said elongated relatively rigid round cylindrical object into said first portion to be retained therein;

attaching means for attaching said mounting device to said support surface with said end surfaces in contact with said support surface; and said arcuate section being spaced from said end surfaces so that said portion of said elongated relatively rigid object is spaced from said support surface.

2. Apparatus for use in attaching an elongated relatively rigid cylindrical object to a support surface so that the elongated relatively rigid cylindrical object is spaced from the support surface of a support member comprising:

a plurality of individual mounting devices mounted in abutting relationship to provide an elongated row of mounting devices having a longitudinal axis extending therethrough;

each of said mounting devices having a central body portion and spaced apart leg portions having end surfaces;

each of said mounting devices having at least one inner surface;

said at least one inner surface having a first portion having an arcuate section having an arcuate extent greater than one hundred and eighty degrees and having spaced apart terminal end portions so that a portion of said elongated relatively rigid cylindrical object may be retained therein;

said at least one inner surface having second portions located between said spaced apart terminal end portions and said end surfaces;

tool means for moving one of said mounting devices over said elongated relatively rigid cylindrical object while said elongated relatively rigid cylindrical object is in contact with said support surface so that movement of said elongated relatively rigid cylindrical object in the same direction as said mounting device is prevented;

restraining means for restraining pivotal movement of said leg portions relative to said central body portion when said one of said mounting devices is moved over said elongated relatively rigid cylindrical object;

force applying means for moving said elongated relatively rigid cylindrical object in a direction opposite to the direction of movement of said one of said mounting devices first to move said portion of said elongated relatively rigid cylindrical object into said first portion to be retained therein;

attaching means for attaching said one of said mounting devices to said support surface with said end surfaces in contact with said support surface; and said arcuate section being spaced from said end surfaces so that said portion of said elongated relatively rigid object in said arcuate section is spaced from said support surface.

3. The apparatus in claim 2 wherein said force applying means comprise:

each of said mounting devices is formed from a plastic material having resilient characteristics greater than said elongated cylindrical object so that it will deform when a sufficient force is applied thereto and resile back toward its original shape when said sufficient force is removed.

4. Apparatus as in claim 2 wherein said force applying means comprises:

said elongated relatively rigid cylindrical object is formed from a plastic material having resilient characteristics greater than those of said each of said mounting devices so that portions of said elongated relatively rigid cylindrical object will deform when a sufficient force is applied thereto and resile back toward its original shape when the sufficient force is removed.

5. The apparatus as in claim 2 wherein said restraining means comprise:

at least portions of said attaching means embedded into said support member; and at least other portions of said attaching means located in said leg portions.

6. Apparatus as in claim 2 and further comprising:

interlocking means between adjacent ones of said plurality of mounting devices to restrain relative movement therebetween in one direction but to permit relative movement therebetween in another direction: and portions of said second portions adjacent to said end surfaces being spaced apart a distance greater than the distance between said spaced apart terminal end portions.

7. The apparatus as in claim 6 and further comprising:

each of said mounting devices having at least one bore extending therethrough and having an opening in at least one of said end surfaces;

said attaching means including a surface penetrating fastening device having at least a portion thereof located in said at least one bore and in frictional relationship therewith;

each of said mounting devices having spaced apart surfaces facing in opposite directions;

said interlocking means comprising at least one interlocking rib portion on one of said surfaces and at least one interlocking groove portion in another of said surfaces;

each of said mounting devices having its interlocking rib located in the interlocking groove of an adjacent one of said mounting devices to form an interlocking frictional relationship between adjacent mounting devices; and said frictional relationship of said interlocking means being greater than said frictional relationship between said surface penetrating device and said at least one bore so that a force may be applied to said surface penetrating device to move said surface penetrating device through said at least one bore to embed at least a portion of said surface penetrating device into said support member without inducing any significant movement of said one of said mounting devices.

8. The apparatus as in claim 7 wherein:

said at least one bore comprises at least two bores extending through each of said mounting devices; and a surface penetrating device located in each of said at least two bores.

9. The apparatus as in claim 8 and further comprising:

said surface penetrating devices having at least a portion thereof located outside of said bores.

10. Apparatus as in claim 2 and further comprising:

the distance between at least one of said terminal end portions and one of said end surfaces is less than one-half the diameter of said elongated relatively rigid cylindrical object.

11. The apparatus as in claim 2 wherein:

said inner surface having generally arcuate portions located between each of said terminal end portions and each of said end surfaces with said end surfaces being spaced apart a greater distance than said spaced apart terminal end portions.

12. The apparatus as in claim 2 and further comprising:

each of said mounting devices having at least one bore extending therethrough and having an opening in at least one of said leg portions;

said attaching means including a surface penetrating fastening device having at least a portion thereof located in said at least one bore and in frictional relationship therewith;

each of said mounting devices having front and rear surfaces;

interlocking means comprising at least one interlocking rib portion on one of said front and rear surfaces and at least one interlocking groove portion in another of said front and rear surfaces;

each of said mounting devices having its interlocking rib located in the interlocking groove of an adjacent one of said mounting devices to form an interlocking frictional relationship between adjacent mounting devices; and said frictional relationship of said interlocking means being greater than said frictional relationship between said surface penetrating device and said at least one bore so that a force may be applied to said surface penetrating fastening device to move said surface penetrating device through said at least one bore to embed at least a portion of said surface penetrating device into said support member without inducing significant movement of said one of said mounting devices.

13. The apparatus as in claim 12 wherein:

said at least one bore comprises at least two bores extending through each of said mounting devices; and a surface penetrating device located in each of said at least two bores.

14. The apparatus as in claim 13 and further comprising:

each of said bores having first portion and a second portion with a shoulder formed at the juncture of said first and second portions; and each of said surface penetrating devices having an enlarged head portion for contacting said shoulder so that when a force in an amount to overcome said frictional relationship is applied to said surface penetrating device after said enlarged head portion has moved into contact with said shoulder, said one of said mounting devices will move relative to the other of said mounting devices.

15. The apparatus in claim 14 wherein:

each of said mounting devices is formed from a plastic material having resilient characteristics so that it will deform when a sufficient force is applied thereto and resile back to its original shape when said sufficient force is removed.

16. The apparatus as in claim 2 and further comprising:

said movement of said one of said mounting devices over a portion of said elongated relatively rigid object applying a force sufficient to deform at least portions of said leg portions immediately adjacent to said arcuate section; and said force applying means comprising a resilient force applied by said deformed portions returning toward their original shape.

17. The apparatus as in claim 16 wherein said restraining means comprise:

at least portions of said attaching means embedded into said support members; and at least other portions of said attaching means located in said leg portions.

18. Apparatus as in claim 2 wherein said tool means comprise:

a body portion;

an elongated lower jaw portion attached to said body portion;

a discharge chamber formed by said elongated lower jaw portion and said body portion;

said elongated lower jaw portion having spaced apart parallel sidewalls;

feed track means extending inwardly from each of said spaced apart parallel sidewalls for supporting said row of mounting devices in said abutting relationship and terminating at said discharge chamber so that one of said mounting devices may be moved from a storage position on said feed track means into said discharge chamber;

additional moving means for moving said row of said mounting devices to move said one of said mounting devices into said discharge chamber;

abutment surface means on the applicator tool device for abutting engagement with said support surface on which said one of said mounting devices is to be fastened;

said one of said mounting devices in said discharge chamber having said end surfaces thereof facing said support surface; and hammer means in said applicator tool for applying forces on said surface penetrating fastening devices in said one of said mounting devices in said discharge chamber to embed said surface penetrating fastening devices into said support member and to move said one of said mounting devices out of said discharge chamber and over said elongated relatively rigid cylindrical object.

19. Apparatus as in claim 18 wherein said restraining means comprise:

at least portions of said attaching means embedded into said support member; and at least other portions of said attaching means located in said leg portions.

20. Apparatus as in claim 18 wherein said restraining means comprise:

said portions of said spaced apart parallel sidewalls having inner surfaces spaced apart a predetermined distance; and oppositely facing side surfaces of said leg portions of each of said mounting devices spaced apart a distance substantially the same as said predetermined distance.

* * * * *